United States Patent
Wu

(10) Patent No.: US 12,082,302 B2
(45) Date of Patent: Sep. 3, 2024

(54) TERMINAL CAPABILITY NEGOTIATION METHOD, TERMINAL DEVICE, AND NETWORK SIDE DEVICE

(71) Applicant: VIVO MOBILE COMMUNICATION CO., LTD., Guangdong (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 406 days.

(21) Appl. No.: 17/375,628

(22) Filed: Jul. 14, 2021

(65) Prior Publication Data
US 2021/0345097 A1   Nov. 4, 2021

Related U.S. Application Data

(63) Continuation of application No. PCT/CN2020/072702, filed on Jan. 17, 2020.

(30) Foreign Application Priority Data

Jan. 18, 2019   (CN) .......................... 201910048312.2

(51) Int. Cl.
*H04W 8/24* (2009.01)
*H04W 8/28* (2009.01)
*H04W 76/10* (2018.01)

(52) U.S. Cl.
CPC ............... *H04W 8/24* (2013.01); *H04W 8/28* (2013.01); *H04W 76/10* (2018.02)

(58) Field of Classification Search
CPC ......... H04W 8/24; H04W 8/28; H04W 76/10; H04W 76/25; H04W 76/11; H04W 8/08; H04W 8/26; H04W 76/15; H04W 8/205; H04W 8/245; H04W 28/18; H04W 28/22; H04W 72/21; H04W 72/23;
(Continued)

(56) References Cited

U.S. PATENT DOCUMENTS 7,894,444 B2    2/2011 Lohr et al.
9,544,042 B2 *  1/2017 Li ..................... H04B 7/0871
(Continued)

FOREIGN PATENT DOCUMENTS

CN    102469495 A    5/2012
CN    106170147 A    11/2016
(Continued)

OTHER PUBLICATIONS

Vivo. "Analysis on the feasibility and technical restrictions of dual registration" 3GPP TSG-RAN WG2 Meeting #100 R2-1712995. Reno, USA; Nov. 27-Dec. 1, 2017.
(Continued)

*Primary Examiner* — Brian T O Connor
(74) *Attorney, Agent, or Firm* — Harness, Dickey & Pierce, P.L.C.

(57) ABSTRACT

A terminal capability negotiation method includes: in a case that a terminal device has at least two terminal identifiers, reporting capability allocation information of the terminal device to a network side device, where the capability allocation information is used to indicate an available capability of at least one terminal identifier, and the at least one terminal identifier is a terminal identifier in the at least two terminal identifiers.

20 Claims, 3 Drawing Sheets

In a case that a terminal device has at least two terminal identifiers, report capability allocation information of the terminal device to a network side device — 201

(58) Field of Classification Search
CPC . H04W 52/281; H04W 52/146; H04W 8/183; H04W 60/005; H04W 88/06; H04W 52/365; H04W 52/367; H04W 52/18; H04W 52/28; H04W 52/30; H04W 52/34
See application file for complete search history.

(56) References Cited

U.S. PATENT DOCUMENTS

| | | | |
|---|---|---|---|
| 9,894,547 | B2 | 2/2018 | Das et al. |
| 10,111,276 | B2 * | 10/2018 | Dhanapal .............. H04W 76/30 |
| 10,511,988 | B2 * | 12/2019 | Astrom ............. H04W 28/0205 |
| 10,568,073 | B2 * | 2/2020 | Pathak .................. H04W 76/27 |
| 11,412,406 | B2 * | 8/2022 | Mukherjee ............ H04L 1/1812 |
| 11,425,556 | B2 * | 8/2022 | Chen ..................... H04W 76/27 |
| 11,729,848 | B2 * | 8/2023 | Yilmaz ................. H04W 76/16 370/329 |
| 2016/0219648 | A1 * | 7/2016 | Awoniyi-Oteri ........ H04W 8/24 |
| 2016/0345244 | A1 | 11/2016 | Chuttani et al. |
| 2017/0171902 | A1 | 6/2017 | Tillman et al. |
| 2017/0280366 | A1 | 9/2017 | Sahu et al. |
| 2018/0160422 | A1 * | 6/2018 | Pathak .................. H04W 76/10 |
| 2019/0069193 | A1 * | 2/2019 | Astrom ............... H04W 52/028 |
| 2020/0029321 | A1 | 1/2020 | Zhang et al. |
| 2021/0120524 | A1 * | 4/2021 | Palle .................. H04W 68/005 |
| 2022/0256328 | A1 * | 8/2022 | Xie ......................... H04W 8/24 |

FOREIGN PATENT DOCUMENTS

| | | |
|---|---|---|
| CN | 107222847 A | 9/2017 |
| CN | 107889241 A | 4/2018 |
| CN | 107959945 A | 4/2018 |
| CN | 108650672 A | 10/2018 |
| CN | 109076455 A | 12/2018 |
| JP | 200753747 A | 3/2007 |
| JP | 2017515396 A | 6/2017 |
| WO | WO-2016118248 A1 | 7/2016 |
| WO | WO-2018141081 A1 | 8/2018 |
| WO | WO-2018141148 A1 | 8/2018 |

OTHER PUBLICATIONS

First Office Action Issued in Chinese Priority Application No. 201910048312.2 dated Dec. 29, 2020. Translation provided by Bohui Intellectual Property.

Second Office Action Issued in Chinese Priority Application No. 201910048312.2 dated Jun. 23, 2021. Translation provided by Bohui Intellectual Property.

International Search Report and Written Opinion of the International Searching Authority regarding International Patent Application No. PCT/CN2020/072702, dated Apr. 2, 2020. Translation provided by Bohui Intellectual Property.

Extended European Search Report regarding European Patent Application No. 20741923.5-1215/3913948; PCT/CN2020/072702, dated Aug. 3, 2022.

"TS.37—Requirements for Multi SIM Devices, Verson 5.0," GSM Association, XP055657356, dated Dec. 4, 2018.

"3rd Generation Partnership Project; Technical Specification Group Radio Access Network; NR; Radio Resource Control (RRC) protocol specification (Release 15)," 3GPP TS 38.331, V15.4.0, XP051591713, dated Jan. 14, 2019.

"LTE Quick Reference—RRC IE—UE Capability Info," Sharetechnote, XP055946122, dated Jan. 5, 2019.

First Office Action regarding Japanese Patent Application No. 2021-541159, dated Aug. 10, 2022.

3GPP TSG RAN, "Evolved Universal Terrestrial Radio Access (E-UTRA) User Equipment (UE) Radio Access Capabilities (Release 12)", 3GPP TS 36.306 V12.0.0, Mar. 2014.

Second Office Action regarding European Patent Application No., 20741923.5, dated Apr. 23, 2024.

* cited by examiner

In a case that a terminal device has at least two terminal identifiers, report capability allocation information of the terminal device to a network side device — 201

Receive capability allocation information of a terminal device reported by the terminal device — 301

TERMINAL CAPABILITY NEGOTIATION METHOD, TERMINAL DEVICE, AND NETWORK SIDE DEVICE

CROSS-REFERENCE TO RELATED APPLICATIONS

This application is a Bypass Continuation Application of PCT/CN2020/072702, filed on Jan. 17, 2020, which claims priority to Chinese Patent Application No. 201910048312.2, filed on Jan. 18, 2019, which are incorporated herein by reference in their entirety.

TECHNICAL FIELD

The present disclosure relates to the field of communications technologies, and in particular, to a terminal capability negotiation method, a terminal device, and a network side device.

BACKGROUND

One user equipment (UE) (also referred to as a terminal device) may have a plurality of subscriber identity module (SIM) cards (multi-SIM UE) at the same time, or register with a network for a plurality of times (multi-registration UE) at the same time. Such UE may camp and/or establish a connection in a plurality of cells at the same time. Cells in which UE may camp and/or establish a connection at the same time may be a same cell, or may be different cells, and radio technology types of different cells may be the same or different. For example, a cell 1 is fourth generation (4G) Long Term Evolution (LTE), and a cell 2 is fifth generation (5G) new radio (NR).

SUMMARY

Embodiments of the present disclosure provide a terminal capability negotiation method, a terminal device, and a network side device.

According to a first aspect, an embodiment of the present disclosure provides a terminal capability negotiation method. The method is applied to a terminal device and includes:

in a case that the terminal device has at least two terminal identifiers, reporting capability allocation information of the terminal device to a network side device, where the capability allocation information is used to indicate an available capability of at least one terminal identifier, and the at least one terminal identifier is a terminal identifier in the at least two terminal identifiers.

According to a second aspect, an embodiment of the present disclosure provides a terminal capability negotiation method. The method is applied to a network side device and includes:

receiving capability allocation information of a terminal device reported by the terminal device, where the capability allocation information is used to indicate an available capability of at least one terminal identifier, and the at least one terminal identifier is a terminal identifier in at least two terminal identifiers of the terminal device.

According to a third aspect, an embodiment of the present disclosure further provides a terminal device. The terminal device includes:

a reporting module, configured to: in a case that the terminal device has at least two terminal identifiers, report capability allocation information of the terminal device to a network side device, where the capability allocation information is used to indicate an available capability of at least one terminal identifier, and the at least one terminal identifier is a terminal identifier in the at least two terminal identifiers.

According to a fourth aspect, an embodiment of the present disclosure further provides a network side device. The network side device includes:

a receiving module, configured to receive capability allocation information of a terminal device reported by the terminal device, where the capability allocation information is used to indicate an available capability of at least one terminal identifier, and the at least one terminal identifier is a terminal identifier in at least two terminal identifiers of the terminal device.

According to a fifth aspect, an embodiment of the present disclosure further provides a terminal device, including a processor, a memory, and a program that is stored in the memory and executable on the processor, where when the processor executes the program, the steps of the terminal capability negotiation method provided in the first aspect are implemented.

According to a sixth aspect, an embodiment of the present disclosure further provides a network side device, including a processor, a memory, and a program that is stored in the memory and executable on the processor, where when the processor executes the program, the steps of the terminal capability negotiation method provided in the second aspect are implemented.

According to a seventh aspect, an embodiment of the present disclosure further provides a non-transitory computer-readable storage medium, where the non-transitory computer-readable storage medium stores a program, and when a processor executes the program, the steps of the terminal capability negotiation method provided in the first aspect or the steps of the terminal capability negotiation method provided in the second aspect are implemented.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following description show merely some embodiments of the present disclosure, and a person of ordinary skill in the art may still derive other drawings from these accompanying drawings.

DESCRIPTION OF EMBODIMENTS

Figures 1, 2, 3:
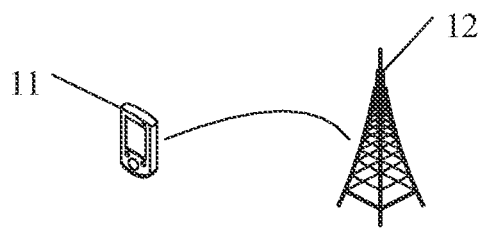
FIG. 1 is a structural diagram of a network system to which embodiments of the present disclosure can be applied.
FIG. 2 is a flowchart of a terminal capability negotiation method according to an embodiment of the present disclosure.
FIG. 3 is a flowchart of a terminal capability negotiation method according to still another embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

Terms "first", "second", etc. in the Description and Claims of the present application are used to distinguish similar objects, instead of describing a specific sequence or order. It should be understood that data used in this way may be interchangeable in appropriate cases, so that the embodiments of this application described herein are implemented in a sequence other than those shown or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. In addition, in the specification and claims, "and/or" is used to indicate at least one of connected objects, for example, A and/or B and/or C indicates seven cases: only A, only B, only C, both A and B, both B and C, both A and C, and A, B and C. Similarly, the use of "at least one of A and B" in this specification and claims should be understood as "only A, only B, both A and B".

For ease of description, the following describes some terms in the embodiments of the present disclosure.

Multi-SIM and multi-registration UE:

One UE may have a plurality of SIM cards (that is, multi-SIM UE) at the same time, or register with a network for a plurality of times (that is, multi-registration UE) at the same time. Cells in which the UE may camp and/or establish a connection at the same time may be a same cell, or may be different cell.

The foregoing plurality of working cells of the UE may have a same working state or different working states. For example, the UE works in both a cell 1 and a cell 2. A working state of the UE in the cell 1 may be in an idle (IDLE) state, an inactive (INACTIVE) state, or a connected (CONNECTED) state. A working state of the UE in the cell 2 may be in an idle state, an inactive state, or a connected state.

Multi-SIM and multi-registration UE capability:

Multi-SIM and multi-registration UE shares a UE capability for signal sending and/or receiving of connections of different UE identifiers, for example, for a layer 2 (L2) buffer, and connections of different UE identifiers may share a layer 2 buffer of 20 M.

In addition, the UE may have different terminal identifiers (UE identifiers) in a plurality of working cells. For example, a terminal identifier of the UE in a cell 1 is a system architecture evolution-temporary mobile subscriber identity (S-TMSI) 1, and a terminal identifier of the UE in a cell 2 is an S-TMSI2.

However, in the related art, in a case in which connections of different terminal identifiers share a UE capability, there is no related solution of negotiating the UE capability between the connections of the different terminal identifiers.

An embodiment of the present disclosure provides a terminal capability negotiation method. Referring to FIG. 1, FIG. 1 is a structural diagram of a network system to which embodiments of the present disclosure can be applied. As shown in FIG. 1, the network system includes a terminal device 11 and a network side device 12. The terminal device 11 may be a user side device such as a mobile phone, a tablet personal computer, a laptop computer, a personal digital assistant (PDA), a mobile Internet device (MID), or a wearable device. It should be noted that a specific type of the terminal device 11 is not limited in this embodiment of the present disclosure. The network side device 12 may be a base station, for example, a macro base station, an LTE eNB, a 5G NR NB, or a gNB. The network side device 12 may be alternatively a small cell, for example, a low power node (LPN) pico or a femto, or the network side device 12 may be an access point (AP). The base station may be alternatively a network node formed by a central unit (CU) and a plurality of TRPs that are managed and controlled by the CU. It should be noted that a specific type of the network side device 12 is not limited in this embodiment of the present disclosure.

In this embodiment of the present disclosure, when the terminal device 11 registers with a network side for a plurality of times, the terminal device 11 may obtain a plurality of terminal identifiers. In a case that a wireless connection capability of the terminal device 11 is shared between connections of different terminal identifiers, the terminal device 11 may perform wireless connection capability negotiation. For example, in a cate that the terminal device 11 has at least two terminal identifiers, capability allocation information of the terminal device 11 is reported to the network side device 12.

The foregoing terminal identifier may include but is not limited to at least one of the following: a SIM card number, an international mobile subscriber identity (IMSI), a temporary mobile subscriber identity (TMSI), a system architecture evolution TMSI (S-TMSI), a fifth generation system architecture evolution TMSI (5G-S-TMSI), or a radio network temporary identity (RNTI).

It should be noted that the at least two terminal identifiers of the terminal device 11 may be in a same working state or different working states. For example, a UE ID-1 is in an idle state, and a UE ID-2 is in a connected state; or a UE ID-1 is in a connected state, and a UE ID-2 is also in a connected state.

Optionally, the capability allocation information is used to indicate an available capability of at least one terminal identifier in the at least two terminal identifiers. Optionally, the capability allocation information may include at least one of the at least one terminal identifier, available capability information of each terminal identifier in the at least one terminal identifier, or the like. The at least one terminal identifier is a terminal identifier in the at least two terminal identifiers of the terminal device 11, and the available capability information may include but is not limited to at least one of the following: an available L2 buffer size, an available wireless connection configuration, an available band combination, an available band, a maximum supported data rate, or an available radio technology type.

The radio technology type may include but is not limited to at least one of the following: Code Division Multiple Access (CDMA); CDMA2000; a GSM/EDGE radio access network (GERAN); a UMTS terrestrial radio access network (UTRAN); an evolved UMTS terrestrial radio access network (E-UTRAN); a fifth generation new radio (5G NR); Wi-Fi; or Bluetooth.

Optionally, the terminal device 11 may report the capability allocation information of the terminal device 11 in a case that a protocol predefines that or the network side device 12 indicates that the terminal device 11 is allowed to report the capability allocation information.

Optionally, the terminal device 11 may report the capability allocation information of the terminal device 11 by using at least one terminal identifier, where the at least one terminal identifier is a terminal identifier for which a wireless connection is established or that is in a wireless connection establishment process in the at least two terminal identifiers.

Optionally, in or after or before the wireless connection establishment process, the terminal device 11 may report the capability allocation information of the terminal device 11 by using the terminal identifier for which the wireless connection is established or that is in the wireless connection establishment process.

It should be noted that reporting the capability allocation information of the terminal device 11 by using a terminal identifier may be adding the terminal identifier during reporting a message that carries the capability allocation information of the terminal device 11, or reporting the capability allocation information of the terminal device 11 through a connection of the terminal identifier, or may mean that a transmission resource for reporting the capability allocation information of the terminal device 11 is a transmission resource corresponding to the terminal identifier.

When receiving the capability allocation information reported by the terminal device 11, the network side device 12 may configure or reconfigure connections of some or all terminal identifiers of the terminal device 11 based on the capability allocation information, to ensure that configuration or data transmission on a network side does not exceed a capability of the terminal device 11, thereby reducing a data loss and improving data transmission reliability.

An embodiment of the present disclosure provides a terminal capability negotiation method, applied to a terminal device. Referring to FIG. 2, FIG. 2 is a flowchart of a terminal capability negotiation method according to an embodiment of the present disclosure. As shown in FIG. 2, the method includes the following steps.

Step 201: In a case that a terminal device has at least two terminal identifiers, report capability allocation information of the terminal device to a network side device.

The capability allocation information is used to indicate an available capability of at least one terminal identifier, and the at least one terminal identifier is a terminal identifier in the at least two terminal identifiers.

In this embodiment, each of the foregoing terminal identifiers may include but is not limited to at least one of a SIM card number, an IMSI, a TMSI, an S-TMSI, a 5G-S-TMSI, an RNTI, or the like. For example, UE registers with or is attached to a network side through one or more SIM cards for a plurality of times, to obtain two terminal identifiers: a UE ID-1 and a UE ID-2.

It should be noted that the at least two terminal identifiers of the terminal device may be in a same working state or different working states. For example, the UE ID-1 is in an idle state, and the UE ID-2 is in a connected state.

The capability allocation information is used to indicate an available capability of at least one terminal identifier in the at least two terminal identifiers. Optionally, the capability allocation information may include at least one of the at least one terminal identifier, available capability information of each terminal identifier in the at least one terminal identifier, or the like. The at least one terminal identifier is a terminal identifier in the at least two terminal identifiers of the terminal device, and the available capability information may include but is not limited to at least one of the following: an available L2 buffer size, an available wireless connection configuration, an available band combination, an available band, a maximum supported data rate, or an available radio technology type.

In actual application, when the terminal device registers with a network side for a plurality of times, the terminal device may obtain a plurality of terminal identifiers. In a case that a wireless connection capability of the terminal device needs to be shared between connections of different terminal identifiers, the terminal device may perform wireless connection capability negotiation, that is, in a case that there are at least two terminal identifiers, the terminal device may report the capability allocation information of the terminal device to the network side device. Therefore, the network side device may configure or reconfigure connections of some or all terminal identifiers of the terminal device based on the capability allocation information reported by the terminal device, to ensure that configuration or data transmission on the network side does not exceed a capability of the terminal device.

In this embodiment of the present disclosure, in the case that the terminal device has the at least two terminal identifiers, the capability allocation information of the terminal device is reported to the network side device, to notify the network side device of the available capability of the at least one terminal identifier. This not only implements negotiation on allocation of a UE capability between connections of different terminal identifiers in a case that the connections of the different terminal identifiers share the UE capability, but also reduces a problem that data is lost because data transmission exceeds the UE capability, thereby improving data transmission reliability.

Optionally, the reporting capability allocation information of the terminal device to a network side device in step 201 may include:

if a protocol predefines that the terminal device is allowed to report the capability allocation information, reporting the capability allocation information of the terminal device to the network side device; or if first indication information received from the network side device indicates that the terminal device is allowed to report the capability allocation information, reporting the capability allocation information of the terminal device to the network side device, where the first indication information is used to indicate whether the capability allocation information is allowed to be reported.

In an implementation, a protocol may predefine whether the terminal device is allowed to report the capability allocation information. In a case that the protocol predefines that the terminal device is allowed to report the capability allocation information, the capability allocation information of the terminal device is reported to the network side device. In a case that the protocol predefines that the terminal device is not allowed to report the capability allocation information, the capability allocation information of the terminal device is not reported to the network side device.

In this embodiment, the protocol predefines whether the terminal device is allowed to report the capability allocation information, thereby saving signaling. This implementation is relatively simple.

In another implementation, the network side device may indicate whether the terminal device is allowed to report the capability allocation information. For example, the network side device may indicate, by using system information (for example, a system information block (SIB), such as a SIBx) or dedicated signaling (for example, an RRCReconfiguration message), whether the terminal device is allowed to report the capability allocation information. The terminal device may report the capability allocation information only when the network side device indicates that the capability allocation information reported by the terminal device is allowed to be received.

For another example, the network side device may indicate network side capability information by using system information (for example, a SIBx) or dedicated signaling (for example, an RRCReconfiguration message), to indicate whether the network side device supports receiving of the capability allocation information reported by the terminal device. In this case, the terminal device may report the capability allocation information only when the network side device indicates that the network side device supports receiving of the capability allocation information reported by the terminal device.

In this embodiment, the network side device indicates whether the terminal device is allowed to report the capability allocation information, so that reporting control flexibility of the capability allocation information can be improved.

Optionally, the reporting capability allocation information of the terminal device to a network side device includes:

reporting the capability allocation information of the terminal device by using a first terminal identifier, where the first terminal identifier is at least one terminal identifier for which a wireless connection is established or that is in a wireless connection establishment process in the at least two terminal identifiers.

In this embodiment, the first terminal identifier may be at least one terminal identifier for which a wireless connection is established or that is in a wireless connection establishment process in the at least two terminal identifiers.

It should be noted that reporting the capability allocation information of the terminal device by using a first terminal identifier may be adding the first terminal identifier during reporting a message that carries the capability allocation information of the terminal device, or reporting the capability allocation information of the terminal device through a connection of the first terminal identifier, or may mean that a transmission resource (for example, at least one of a time domain resource, a frequency domain resource, a space resource, or a code domain resource) for reporting the capability allocation information of the terminal device is a transmission resource corresponding to the first terminal identifier.

It should be noted that, in a case that the first terminal identifier includes a plurality of terminal identifiers, capability allocation information of the terminal device reported by using the terminal identifiers may be the same or may be different.

For example, if the first terminal identifier includes a UE ID-1 and a UE ID-2, available capability information of the UE ID-1 and available capability information of the UE ID-2 may be reported through the UE ID-1, and the available capability information of the UE ID-1 and the available capability information of the UE ID-2 may also be reported through the UE ID-2; or available capability information of the UE ID-1 may be reported through the UE ID-1, and available capability information of the UE ID-2 may be reported through the UE ID-2.

Optionally, the reporting the capability allocation information of the terminal device by using a first terminal identifier includes:

reporting the capability allocation information of the terminal device by using the first terminal identifier in or after a wireless connection establishment process, where a terminal identifier used in the wireless connection establishment process is the first terminal identifier or a second terminal identifier, and the second terminal identifier is at least one terminal identifier other than the first terminal identifier in the at least two terminal identifiers.

In this embodiment, a trigger condition for reporting the capability allocation information of the terminal device by using the first terminal identifier may be in or after the wireless connection establishment process.

For example, in a process of establishing a wireless connection of a terminal identifier a1, the capability allocation information of the terminal device may be reported by using the terminal identifier a1, or in a case that establishment of a wireless connection of the terminal identifier a1 is completed, the capability allocation information of the terminal device may be reported by using the terminal identifier a1, or in a process of establishing a wireless connection of the terminal identifier a1, the capability allocation information of the terminal device is reported by using a terminal identifier a2 for which a wireless connection is established.

Optionally, the first terminal identifier is at least one terminal identifiers for which a wireless connection is established in the at least two terminal identifiers; and the reporting the capability allocation information of the terminal device by using a first terminal identifier includes:

reporting the capability allocation information of the terminal device by using the first terminal identifier after or before a wireless connection establishment process, where a terminal identifier used in the wireless connection establishment process is a second terminal identifier, and the second terminal identifier is at least one terminal identifier other than the first terminal identifier in the at least two terminal identifiers.

In this embodiment, because there is the first terminal identifier for which a wireless connection is established, the capability allocation information of the terminal device may be reported by using the first terminal identifier in or after or before a wireless connection establishment process of the second terminal identifier. That is, the trigger condition for reporting the capability allocation information of the terminal device by using the first terminal identifier may be in or after or before the wireless connection establishment process of the second terminal identifier.

In actual application, before a wireless connection of a terminal identifier is established, available capability information of a terminal identifier for which no wireless connection is established may be reported by using the terminal identifier for which the wireless connection is established, so that the network side device can establish the wireless connection of the terminal identifier based on the available capability information of the terminal identifier or which no wireless connection is established.

It should be noted that, the foregoing implementations of reporting the capability allocation information of the terminal device to the network side device may be combined based on an actual requirement. For example, if the first indication information received from the network side device indicates that the terminal device is allowed to report the capability allocation information, the capability allocation information of the terminal device is reported by using the first terminal identifier; or if the protocol predefines that the terminal device is allowed to report the capability allocation information, the capability allocation information of the terminal device is reported by using the first terminal identifier.

Optionally, after the reporting the capability allocation information of the terminal device by using a first terminal identifier, the method further includes:

enabling a prohibit timer, where
reporting the capability allocation information of the terminal device by using the first terminal identifier is prohibited before the prohibit timer expires.

In this embodiment, after the capability allocation information of the terminal device is reported by using the first terminal identifier, the prohibit timer may be enabled, and before the prohibit timer expires, reporting the capability allocation information of the terminal device by using the first terminal identifier is prohibited.

For example, after the capability allocation information of the terminal device is reported by using the UE ID-1, the prohibit timer is enabled, and during running of the prohibit timer, reporting the capability allocation information of the terminal device by using the UE ID-1 is no longer triggered.

It should be noted that, before the prohibit timer expires, the terminal device may still report the capability allocation information of the terminal device by using a terminal identifier other than the first terminal identifier in the at least two terminal identifiers.

In this embodiment, reporting the capability allocation information of the terminal device by using the first terminal identifier is prohibited before the prohibit timer expires, thereby reducing repeated reporting the capability allocation information of the terminal device, and saving resources.

Optionally, a parameter of the prohibit timer is predefined in a protocol or configured on a network side.

In this embodiment, the parameter of the prohibit timer may include duration of the prohibit timer.

Optionally, the capability allocation information may include at least one of the following:
at least one terminal identifier; or
available capability information of each terminal identifier in at least one terminal identifier, where
the at least one terminal identifier is a terminal identifier in the at least two terminal identifiers.

In this embodiment, the at least one terminal identifier may include at least one of a first terminal identifier or a second terminal identifier, where the first terminal identifier may be a terminal identifier currently used to report capability allocation information of the terminal device, and the second terminal identifier may be at least one terminal identifier other than the first terminal identifier in the at least two terminal identifiers.

It should be noted that, the terminal identifier currently used to report the capability allocation information of the terminal device, may be implicitly indicated through a connection between the terminal device and the network side, that is, the terminal identifier may not be carried in reporting signaling.

In an implementation, the capability allocation information may include at least one terminal identifier. In this case, available capability information of each terminal identifier in the at least one terminal identifier may be predefined in a protocol. For example, the protocol may predefine that all available capability information of the terminal device is evenly allocated between the at least two terminal identifiers. In a case that the capability allocation information includes a UE ID-1 and a UE ID-2, all the available capability information of the terminal device may be evenly allocated between the UE ID-1 and the UE ID-2.

In another implementation, the capability allocation information may include available capability information of each terminal identifier in at least one terminal identifier. For example, available capability information of the foregoing first terminal identifier may be included, and the foregoing first terminal identifier may be implicitly indicated through a connection between the terminal device and the network side.

In another implementation, the capability allocation information may include at least one terminal identifier and available capability information of each terminal identifier in the at least one terminal identifier.

For example, the foregoing capability allocation information may include a UE ID-1 and a UE ID-2, and available capability information of the UE ID-1 and available capability information of the UE ID-2.

For another example, the capability allocation information may include a UE ID-2, and available capability information of a UE ID-1, and available capability information of the UE ID-2, where the UE ID-1 is a terminal identifier currently used to report the capability allocation information of the terminal device, and is implicitly indicated through a connection between the terminal device and the network side.

For another example, the capability allocation information may include a UE ID-2 and available capability information of the UE ID-2, where a UE ID-1 is a terminal identifier currently used to report the capability allocation information of the terminal device, and is implicitly indicated through a connection between the terminal device and the network side, and available capability information of the UE ID-1 may be calculated through total capability information of the terminal device and the available capability information of the UE ID-2.

Optionally, the available capability information may include at least one of the following:
an available L2 buffer size;
an available wireless connection configuration;
an available band combination;
an available band;
a maximum supported data rate; or
an available radio technology type.

The following uses the available capability information of the UE ID-1 as an example for description.

For the foregoing available L2 buffer size, for example, a total L2 buffer size is 20 M, and an available L2 buffer size of the UE ID-1 is 10 M. For the foregoing available wireless connection configuration, for example, an RRCReconfiguration configuration message is available to the UE ID-1. For the foregoing available band combination, for example, an available band combination of the UE ID-1 is Band1+Band2. For the foregoing available band, for example, an available band of the UE ID-1 is Band1. For the foregoing maximum supported data rate, for example, a maximum supported data rate of the UE ID-1 is 10 Mbps. For the foregoing available radio technology types, for example, an available radio technology type of the UE ID-1 is long term evolution (LTE).

Optionally, the available capability information of each terminal identifier may include at least one of the following:
total available capability information of each terminal identifier; or
available capability information of each radio technology type corresponding to each terminal identifier.

In this embodiment, the available capability information of each terminal identifier may include total available capability information of each terminal identifier. For example, the available capability information of the UE ID-1 may include total available capability information of the UE ID-1, and the available capability information of the UE ID-2 may include total available capability information of the UE ID-2.

The available capability information of each terminal identifier may further include available capability information of each radio technology type corresponding to each terminal identifier. For example, the available capability information of the UE ID-1 includes available capability information of a first radio technology type corresponding to the UE ID-1 and available capability information of a second radio technology type corresponding to the UE ID-1. The available capability information of the UE ID-2 includes available capability information of a first radio technology type corresponding to the UE ID-2 and available capability information of a third radio technology type corresponding to the UE ID-2.

In actual application, when the available capability information of each terminal identifier is reported, a radio technology type corresponding to the available capability information of each terminal identifier may be reported. For example, the available capability information of the UE ID-1 includes available capability information a1 and available capability information a2, where the available capability information a1 corresponds to the first radio technology type, and the available capability information a2 corresponds to the second radio technology type.

Optionally, the radio technology type includes at least one of the following: CDMA; CDMA2000; a GERAN; a UTRAN; an E-UTRAN; 5G NR; Wi-Fi; or Bluetooth.

In this embodiment, the foregoing UTRAN may be, for example, wideband code division multiple access (WCDMA) or time division-synchronous code division multiple access (TDS-CDMA). The foregoing E-UTRAN may be, for example, LTE.

An embodiment of the present disclosure provides a terminal capability negotiation method, applied to a network side device. Referring to FIG. 3, FIG. 3 is a flowchart of a terminal capability negotiation method according to an embodiment of the present disclosure. As shown in FIG. 3, the method includes the following steps.

Step 301: Receive capability allocation information of a terminal device reported by the terminal device.

The capability allocation information is used to indicate an available capability of at least one terminal identifier, and the at least one terminal identifier is a terminal identifier in at least two terminal identifiers of the terminal device.

In this embodiment, each of the foregoing terminal identifiers may include but is not limited to at least one of a SIM card number, an IMSI, a TMSI, an S-TMSI, a 5G-S-TMSI, an RNTI, or the like. For example, UE registers with or is attached to a network side through one or more SIM cards for a plurality of times, to obtain two terminal identifiers: a UE ID-1 and a UE ID-2.

It should be noted that the at least two terminal identifiers of the terminal device may be in a same working state or different working states. For example, the UE ID-1 is in an idle state, and the UE ID-2 is in a connected state.

The capability allocation information is used to indicate an available capability of at least one terminal identifier in the at least two terminal identifiers. Optionally, the capability allocation information may include at least one of the at least one terminal identifier, available capability information of each terminal identifier in the at least one terminal identifier, or the like. The at least one terminal identifier is a terminal identifier in the at least two terminal identifiers of the terminal device, and the available capability information may include but is not limited to at least one of the following: an available L2 buffer size, an available wireless connection configuration, an available band combination, an available band, a maximum supported data rate, or an available radio technology type.

In actual application, when a wireless connection capability of the terminal device needs to be shared between connections of different terminal identifiers, the network side device may receive the capability allocation information of the terminal device reported by the terminal device, and may configure or reconfigure connections of some or all terminal identifiers of the terminal device based on the capability allocation information reported by the terminal device, to ensure that configuration or data transmission on the network side does not exceed the capability of the terminal device.

In this embodiment of the present disclosure, the capability allocation information of the terminal device reported by the terminal device is received, so that the connections of some or all terminal identifiers of the terminal device can be configured or reconfigured based on the capability allocation information reported by the terminal device, to reduce a problem that data is lost because data transmission exceeds a UE capability, thereby improving data transmission reliability.

Optionally, the method may further include:

sending first indication information to the terminal device, where the first indication information is used to indicate whether the terminal device is allowed to report the capability allocation information.

In this embodiment, the network side device indicates whether the terminal device is allowed to report the capability allocation information.

For example, the network side device may indicate, by using system information (for example, a SIBx) or dedicated signaling (for example, an RRCReconfiguration message), whether the terminal device is allowed to report the capability allocation information.

For another example, the network side device may indicate network side capability information by using system information (for example, a SIBx) or dedicated signaling (for example, an RRCReconfiguration message), to indicate whether the network side device supports receiving of the capability allocation information reported by the terminal device. In this case, the terminal device may report the capability allocation information only when the network side device indicates that the network side device supports receiving of the capability allocation information reported by the terminal device.

In this embodiment, the network side device indicates whether the terminal device is allowed to report the capability allocation information, so that reporting control flexibility of the capability allocation information can be improved.

Optionally, the receiving capability allocation information of a terminal device reported by the terminal device includes:

receiving the capability allocation information of the terminal device reported by the terminal device by using a first terminal identifier, where the first terminal identifier is at least one terminal identifier for which a wireless connection is established or that is in a wireless connection establishment process in the at least two terminal identifiers included in the terminal device.

In this embodiment, the first terminal identifier may be at least one terminal identifier for which a wireless connection is established or that is in a wireless connection establishment process in the at least two terminal identifiers.

It should be noted that reporting the capability allocation information of the terminal device by using a first terminal identifier may be adding the first terminal identifier during reporting a message that carries the capability allocation information of the terminal device, or reporting the capability allocation information of the terminal device through a connection of the first terminal identifier, or may mean that a transmission resource (for example, at least one of a time domain resource, a frequency domain resource, a space resource, or a code domain resource) for reporting the capability allocation information of the terminal device is a transmission resource corresponding to the first terminal identifier.

It should be noted that, in a case that the first terminal identifier includes a plurality of terminal identifiers, capability allocation information of the terminal device reported by using the terminal identifiers may be the same or may be different.

For example, if the first terminal identifier includes a UE ID-1 and a UE ID-2, available capability information of the UE ID-1 and available capability information of the UE ID-2 may be reported through the UE ID-1, and the available capability information of the UE ID-1 and the available capability information of the UE ID-2 may also be reported through the UE ID-2; or available capability information of the UE ID-1 may be reported through the UE ID-1, and available capability information of the UE ID-2 may be reported through the UE ID-2.

Optionally, the network side device may receive, in or after a wireless connection establishment process, the capability allocation information of the terminal device reported by using the first terminal identifier, where a terminal identifier used in the wireless connection establishment process is the first terminal identifier or a second terminal identifier, and the second terminal identifier is at least one terminal identifier other than the first terminal identifier in the at least two terminal identifiers.

Optionally, the network side device may receive, in or after or before a wireless connection establishment process, the capability allocation information of the terminal device reported by using the first terminal identifier, where a terminal identifier used in the wireless connection establishment process is a second terminal identifier, and the second terminal identifier is at least one terminal identifier other than the first terminal identifier in the at least two terminal identifiers.

Optionally, the method may further include:

configuring a parameter of a prohibit timer for the terminal device.

In this embodiment, the parameter of the prohibit timer may include duration of the prohibit timer.

Optionally, the capability allocation information includes at least one of the following:

at least one terminal identifier; or available capability information of each terminal identifier in at least one terminal identifier, where the at least one terminal identifier is a terminal identifier in the at least two terminal identifiers.

In this embodiment, the at least one terminal identifier may include at least one of a first terminal identifier or a second terminal identifier, where the first terminal identifier may be a terminal identifier currently used to report capability allocation information of the terminal device, and the second terminal identifier may be at least one terminal identifier other than the first terminal identifier in the at least two terminal identifiers.

It should be noted that, the terminal identifier currently used to report the capability allocation information of the terminal device, may be implicitly indicated through a connection between the terminal device and the network side, that is, the terminal identifier may not be carried in reporting signaling.

In an implementation, the capability allocation information may include at least one terminal identifier. In this case, available capability information of each terminal identifier in the at least one terminal identifier may be predefined in a protocol. For example, the protocol may predefine that all available capability information of the terminal device is evenly allocated between the at least two terminal identifiers. In a case that the capability allocation information includes a UE ID-1 and a UE ID-2, all the available capability information of the terminal device may be evenly allocated between the UE ID-1 and the UE ID-2.

In another implementation, the capability allocation information may include available capability information of each terminal identifier in at least one terminal identifier. For example, available capability information of the foregoing first terminal identifier may be included, and the foregoing first terminal identifier may be implicitly indicated through a connection between the terminal device and the network side.

In another implementation, the capability allocation information may include at least one terminal identifier and available capability information of each terminal identifier in the at least one terminal identifier.

For example, the foregoing capability allocation information may include a UE ID-1 and a UE ID-2, and available capability information of the UE ID-1 and available capability information of the UE ID-2.

For another example, the capability allocation information may include a UE ID-2, and available capability information of a UE ID-1, and available capability information of the UE ID-2, where the UE ID-1 is a terminal identifier currently used to report the capability allocation information of the terminal device, and is implicitly indicated through a connection between the terminal device and the network side.

For another example, the capability allocation information may include a UE ID-2 and available capability information of the UE ID-2, where a UE ID-1 is a terminal identifier currently used to report the capability allocation information of the terminal device, and is implicitly indicated through a connection between the terminal device and the network side, and available capability information of the UE ID-1 may be calculated through total capability information of the terminal device and the available capability information of the UE ID-2.

Optionally, the available capability information includes at least one of the following:

an available L2 buffer size;

an available wireless connection configuration;

an available band combination;

an available band;

a maximum supported data rate; or an available radio technology type.

The following uses the available capability information of the UE ID-1 as an example for description.

For the foregoing available L2 buffer size, for example, a total L2 buffer size is 20 M, and an available L2 buffer size of the UE ID-1 is 10 M. For the foregoing available wireless connection configuration, for example, an RRCReconfiguration configuration message is available to the UE ID-1. For the foregoing available band combination, for example, an available band combination of the UE ID-1 is Band1+Band2. For the foregoing available band, for example, an available band of the UE ID-1 is Band1. For the foregoing maximum supported data rate, for example, a maximum supported data rate of the UE ID-1 is 10 Mbps. For the foregoing available radio technology type, for example, an available radio technology type of the UE ID-1 is LTE.

Optionally, the available capability information of each terminal identifier includes at least one of the following:

total available capability information of each terminal identifier; or available capability information of each radio technology type corresponding to each terminal identifier.

In this embodiment, the available capability information of each terminal identifier may include total available capability information of each terminal identifier. For example, the available capability information of the UE ID-1 may include total available capability information of the UE ID-1, and the available capability information of the UE ID-2 may include total available capability information of the UE ID-2.

The available capability information of each terminal identifier may further include available capability information of each radio technology type corresponding to each terminal identifier. For example, the available capability information of the UE ID-1 includes available capability information of a first radio technology type corresponding to the UE ID-1 and available capability information of a second radio technology type corresponding to the UE ID-1. The available capability information of the UE ID-2 includes available capability information of a first radio technology type corresponding to the UE ID-2 and available capability information of a third radio technology type corresponding to the UE ID-2.

In actual application, when the available capability information of each terminal identifier is reported, a radio technology type corresponding to the available capability information of each terminal identifier may be reported. For example, the available capability information of the UE ID-1 includes available capability information a1 and available capability information a2, where the available capability information a1 corresponds to the first radio technology type, and the available capability information a2 corresponds to the second radio technology type.

Optionally, the radio technology type includes at least one of the following: CDMA; CDMA2000; a GERAN; a UTRAN; an E-UTRAN; 5G NR; Wi-Fi; or Bluetooth.

In this embodiment, the foregoing UTRAN may be, for example, WCDMA or TDS-CDMA. The foregoing E-UTRAN may be, for example, LTE.

Optionally, the network side device is a source node; and after the receiving capability allocation information of a terminal device reported by the terminal device, the method further includes:

sending the capability allocation information of the terminal device to a target node.

In this embodiment, for a moving process, the source node may receive the capability allocation information of the terminal device sent by the terminal device, and send the capability allocation information to the target node.

For example, in a handover process, a gNB1 sends, to a target gNB2, the capability allocation information of the terminal device received from the terminal device. Alternatively, in an SN addition or change process, an master node (MN) or an secondary node (SN) sends, to a target SN, the capability allocation information of the terminal device received from the terminal device.

The following describes this embodiment of the present disclosure with reference to an example.

The terminal capability negotiation method provided in this embodiment of the present disclosure includes the following steps.

Step a1: UE has a plurality of UE identifiers (that is, the foregoing terminal identifiers).

For example, the UE registers with or is attached to a network side through one or more SIM cards for a plurality of times, to obtain two UE identifiers: a UE ID-1 and a UE ID-2.

Each of the plurality of UE identifiers may include one or any combination of the following: a SIM card number, an IMSI, a TMSI, an S-TMSI, a 5G-S-TMSI, and an RNTI.

The plurality of UE identifiers of the UE may be in a same working state or different working states. For example, the UE ID-1 is in an idle state, and the UE ID-2 is in a connected state.

Step a2: A network side configures or a protocol stipulates whether the UE is allowed to report capability allocation information.

For example, the network side may indicate, by using system information (for example, a SIBx) or dedicated signaling (for example, an RRCReconfiguration message), whether the UE is allowed to report the capability allocation information.

For another example, the network side may indicate network side capability information by using system information (for example, a SIBx) or dedicated signaling (for example, an RRCReconfiguration message), to indicate whether the network side supports receiving of the capability allocation information reported by the UE. In this case, the UE may report the capability allocation information only when the network side indicates that the network side supports receiving of the capability allocation information reported by the UE.

Optionally, the network side may further configure a prohibit timer (that is, prohibitTimer) or a protocol stipulates configuration of a prohibit timer (for example, duration of the prohibit timer). During running of the prohibit timer, the UE is allowed to report working cell information of another terminal identifier. The foregoing another terminal identifier may be a terminal identifier in the plurality of terminal identifiers except a terminal identifier currently used to report the capability allocation information.

Step a3: In a case that the network side configures or the protocol stipulates that the UE is allowed to report the capability allocation information, report the capability allocation information of the UE to the network side by using a UE identifier.

For example, the capability allocation information is reported to the network side by using the UE ID-1.

Optionally, the capability allocation information of the UE may be reported to the network side by using at least one other UE identifier of the UE. The at least one other UE identifier may be a UE identifier except the UE identifier used to report the capability allocation information in step a3, for example, a UE identifier other than the UE ID-1.

Optionally, the capability allocation information of the UE may include one or any combination of the following:

at least one UE identifier, for example, the UE ID-1; and available capability information of the at least one UE identifier, for example, available capability information of the UE ID-1.

Optionally, the at least one UE identifier may be at least one of the UE identifier used to report the capability allocation information of the UE or another UE identifier. The another UE identifier may be a UE identifier other than the UE identifier used to report the capability allocation information.

Optionally, the UE identifier used to report the capability allocation information of the UE may be implicitly indicated through a connection between the UE and the network side, and may not be carried in reporting signaling.

The available capability information may include one or any combination of the following:

an available L2 buffer size, for example, a total L2 buffer size is 20 M, and an available L2 buffer size of the UE ID-1 is 10 M;

an available wireless connection configuration, for example, an available RRCReconfiguration configuration message of the UE ID-1;

an available band combination, for example, an available band combination of the UE ID-1 is Band1+Band2;

an available band, for example, an available band of the UE ID-1 is Band1;

a maximum supported data rate, for example, a maximum supported data rate of the UE ID-1 is 10 Mbps; and an available radio technology type, for example, an available radio technology type of the UE ID-1 is LTE.

Optionally, the available capability information may be total available capability information of the UE identifier or available capability information of different radio technology types corresponding to the UE identifier, for example, when the available capability information is reported, a radio technology type corresponding to each piece of available capability information is reported.

The radio technology type may include one or any combination of the following:

CDMA;
CDMA2000;
a GERAN;
an E-UTRAN, for example, LTE;
a UTRAN, for example, WCDMA or TDS-CDMA;
5G NR;
Wi-Fi; and
Bluetooth.

The reporting the capability allocation information of the UE to the network side device by using a UE identifier may include any one of the following:

when a wireless connection is established for at least one UE identifier (for example, the UE ID-1 is in a connected state), reporting the capability allocation information of the UE to the network side by using a UE identifier for which a wireless connection is established in or before or after a wireless connection establishment process of the at least one other UE identifier of the UE, for example, the capability allocation information is reported to the network side device by using the UE ID-1; and reporting the capability allocation information of the UE to the network side device by using the at least one UE identifier of the UE in or after a wireless connection establishment process of the at least one UE identifier.

Optionally, if the network side configures a prohibit timer or the protocol stipulates a configuration of a prohibit timer, after reporting the capability allocation information of the UE, for example, after reporting the capability allocation information of the UE by using the UE ID-1, the UE (for example, the UE ID-1) enables the prohibit timer, and does not trigger reporting the capability allocation information of the UE during running of the prohibit timer.

Optionally, a source node that receives the capability allocation information of the UE reported by the UE may send the capability allocation information of the UE to a target node in a moving process.

For example, in a handover process, a gNB1 sends, to a target gNB2, the capability allocation information of the terminal device received from the terminal device. Alternatively, in an SN addition or change process, an MN or an SN sends, to a target SN, the capability allocation information of the terminal device received from the terminal device.

In actual application, when UE (for example, UE (UE-ID-1) and UE (UE-ID-2)) that registers with the network side for a plurality of times works in one or more cells, when a wireless capability of the UE is shared between wireless connections of different UE identifiers, the UE may perform wireless connection capability negotiation. Optionally, the following negotiation manners may be included:

Manner 1: When a wireless connection is established for at least one UE identifier (for example, the UE ID-1 is in a connected state), in a case that at least one other UE identifier of the UE triggers or is to trigger wireless connection establishment, the capability allocation information of the UE is reported to the network side by using a UE identifier for which a wireless connection is established, for example, the capability allocation information is reported to the network side device by using the UE ID-1.

Optionally, the capability allocation information of the UE may be reported to the network side by using at least one other UE identifier of the UE.

It should be noted that the at least one other UE identifier may be a UE identifier other than the UE identifier for which the wireless connection is established.

Manner 2: When no wireless connection is established for all UE identifiers of the UE, for example, the UE-ID-1 and the UE-ID-2 of the UE are in an idle state or an inactive state, the capability allocation information of the UE may be reported to the network side device by using the at least one UE identifier of the UE in a case that the at least one UE identifier triggers or is to trigger wireless connection establishment.

According to the terminal capability negotiation method provided in this embodiment of the present disclosure, in a case that dual-SIM or dual-registered UE works in a plurality of cells at the same time, if a capability of the UE is shared between a plurality of connections, the capability of the UE between different connections may be negotiated, to ensure that configuration or data transmission on the network side does not exceed a capability of the UE, thereby reducing a data loss and improving connection transmission reliability.

Figure 4:
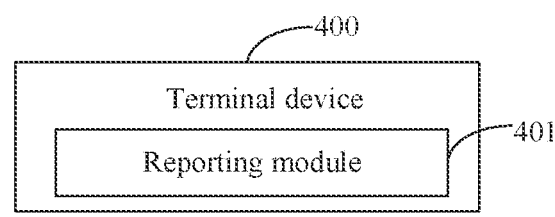
FIG. 4 is a structural diagram of a terminal device according to an embodiment of the present disclosure.

Referring to FIG. 4, FIG. 4 is a structural diagram of a terminal device according to an embodiment of the present disclosure. As shown in FIG. 4, a terminal device 400 includes:

a reporting module 401, configured to: in a case that the terminal device has at least two terminal identifiers, report capability allocation information of the terminal device to a network side device, where the capability allocation information is used to indicate an available capability of at least one terminal identifier, and the at least one terminal identifier is a terminal identifier in the at least two terminal identifiers.

Optionally, the reporting module may be configured to:

if a protocol predefines that the terminal device is allowed to report the capability allocation information, report the capability allocation information of the terminal device to the network side device; or if first indication information received from the network side device indicates that the terminal device is allowed to report the capability allocation information, report the capability allocation information of the terminal device to the network side device, where the first indication information is used to indicate whether the capability allocation information is allowed to be reported.

Optionally, the reporting module may be configured to:
report the capability allocation information of the terminal device by using a first terminal identifier, where
the first terminal identifier is at least one terminal identifier for which a wireless connection is established or that is in a wireless connection establishment process in the at least two terminal identifiers.

Optionally, the reporting module may be configured to:
report the capability allocation information of the terminal device by using the first terminal identifier in or after a wireless connection establishment process, where
a terminal identifier used in the wireless connection establishment process is the first terminal identifier or a second terminal identifier, and the second terminal identifier is at least one terminal identifier other than the first terminal identifier in the at least two terminal identifiers.

Optionally, the first terminal identifier is at least one terminal identifiers for which a wireless connection is established in the at least two terminal identifiers; and
the reporting module may be configured to:
report the capability allocation information of the terminal device by using the first terminal identifier in or after or before a wireless connection establishment process, where
a terminal identifier used in the wireless connection establishment process is a second terminal identifier, and the second terminal identifier is at least one terminal identifier other than the first terminal identifier in the at least two terminal identifiers.

Optionally, the terminal device further includes:
an enable module, configured to enable a prohibit timer after the capability allocation information of the terminal device is reported by using the first terminal identifier, where
reporting the capability allocation information of the terminal device by using the first terminal identifier is prohibited before the prohibit timer expires.

Optionally, a parameter of the prohibit timer is predefined in a protocol or configured on a network side.

Optionally, the capability allocation information includes at least one of the following:
at least one terminal identifier; or
available capability information of each terminal identifier in at least one terminal identifier, where
the at least one terminal identifier is a terminal identifier in the at least two terminal identifiers.

Optionally, the available capability information includes at least one of the following:
an available L2 buffer size;
an available wireless connection configuration;
an available band combination;
an available band;
a maximum supported data rate; or
an available radio technology type.

Optionally, the available capability information of each terminal identifier includes at least one of the following:
total available capability information of each terminal identifier; or
available capability information of each radio technology type corresponding to each terminal identifier.

Optionally, the radio technology type includes at least one of the following:
CDMA;
CDMA2000;
a GERAN;
a UTRAN;
an E-UTRAN;
5G NR;
Wi-Fi; or
Bluetooth.

Optionally, the terminal identifier includes at least one of the following:
a SIM card number;
an IMSI;
a TMSI;
a S-TMSI;
a 5G-S-TMSI; or
a RNTI.

The terminal device 400 provided in this embodiment of the present disclosure can implement the processes implemented by the terminal device in the foregoing method embodiment. To avoid repetition, details are not described herein again.

According to the terminal device 400 in this embodiment of the present disclosure, the reporting module 401 is configured to: in the case that the terminal device has the at least two terminal identifiers, report the capability allocation information of the terminal device to the network side device, where the capability allocation information is used to indicate the available capability of the at least one terminal identifier, and the at least one terminal identifier is a terminal identifier in the at least two terminal identifiers. This not only implements negotiation on allocation of a UE capability between connections of different terminal identifiers in a case that the connections of the different terminal identifiers share the UE capability, but also reduces a problem that data is lost because data transmission exceeds the UE capability, thereby improving data transmission reliability.

Figure 5:
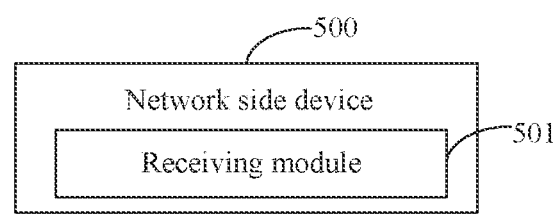
FIG. 5 is a structural diagram of a network side device according to an embodiment of the present disclosure.

Referring to FIG. 5, FIG. 5 is a structural diagram of a network side device according to an embodiment of the present disclosure. As shown in FIG. 5, a network side device 500 includes:
a receiving module 501, configured to receive capability allocation information of a terminal device reported by the terminal device, where
the capability allocation information is used to indicate an available capability of at least one terminal identifier, and the at least one terminal identifier is a terminal identifier in at least two terminal identifiers of the terminal device.

Optionally, the network side device further includes:
a sending module, configured to send first indication information to the terminal device, where the first indication information is used to indicate whether the terminal device is allowed to report the capability allocation information.

Optionally, the receiving module may be configured to:
receive the capability allocation information of the terminal device reported by the terminal device by using a first terminal identifier, where
the first terminal identifier is at least one terminal identifier for which a wireless connection is established or that is in a wireless connection establishment process in the at least two terminal identifiers included in the terminal device.

Optionally, the network side device further includes:
a configuring module, configured to configure a parameter of a prohibit timer for the terminal device.

Optionally, the capability allocation information includes at least one of the following:
at least one terminal identifier; or
available capability information of each terminal identifier in at least one terminal identifier, where the at least one terminal identifier is a terminal identifier in the at least two terminal identifiers.

Optionally, the available capability information includes at least one of the following:
an available L2 buffer size;
an available wireless connection configuration;
an available band combination;
an available band;
a maximum supported data rate; or
an available radio technology type.

Optionally, the available capability information of each terminal identifier includes at least one of the following:
total available capability information of each terminal identifier; or
available capability information of each radio technology type corresponding to each terminal identifier.

Optionally, the radio technology type includes at least one of the following:
CDMA;
CDMA2000;
a GERAN;
a UTRAN;
an E-UTRAN;
5G NR;
Wi-Fi; or
Bluetooth.

Optionally, the terminal identifier includes at least one of the following:
a SIM card number;
an IMSI;
a TMSI;
a S-TMSI;
a 5G-S-TMSI; or
a RNTI.

Optionally, the network side device is a source node; and the network side device further includes:
a second sending module, configured to send the capability allocation information of the terminal device to a target node after the capability allocation information of the terminal device reported by the terminal device is received.

The network side device 500 provided in this embodiment of the present disclosure can implement the processes implemented by the network side device in the foregoing method embodiment. To avoid repetition, details are not described herein again.

According to the network side device 500 in this embodiment of the present disclosure, the receiving module 501 is configured to receive the capability allocation information of the terminal device reported by the terminal device, where the capability allocation information is used to indicate the available capability of the at least one terminal identifier, and the at least one terminal identifier is a terminal identifier in the at least two terminal identifiers of the terminal device. Therefore, a connection of a terminal identifier can be reconfigured based on capability allocation information of the terminal device, to reduce a problem that data is lost because data transmission exceeds a UE capability, thereby improving data transmission reliability.

Figure 6:
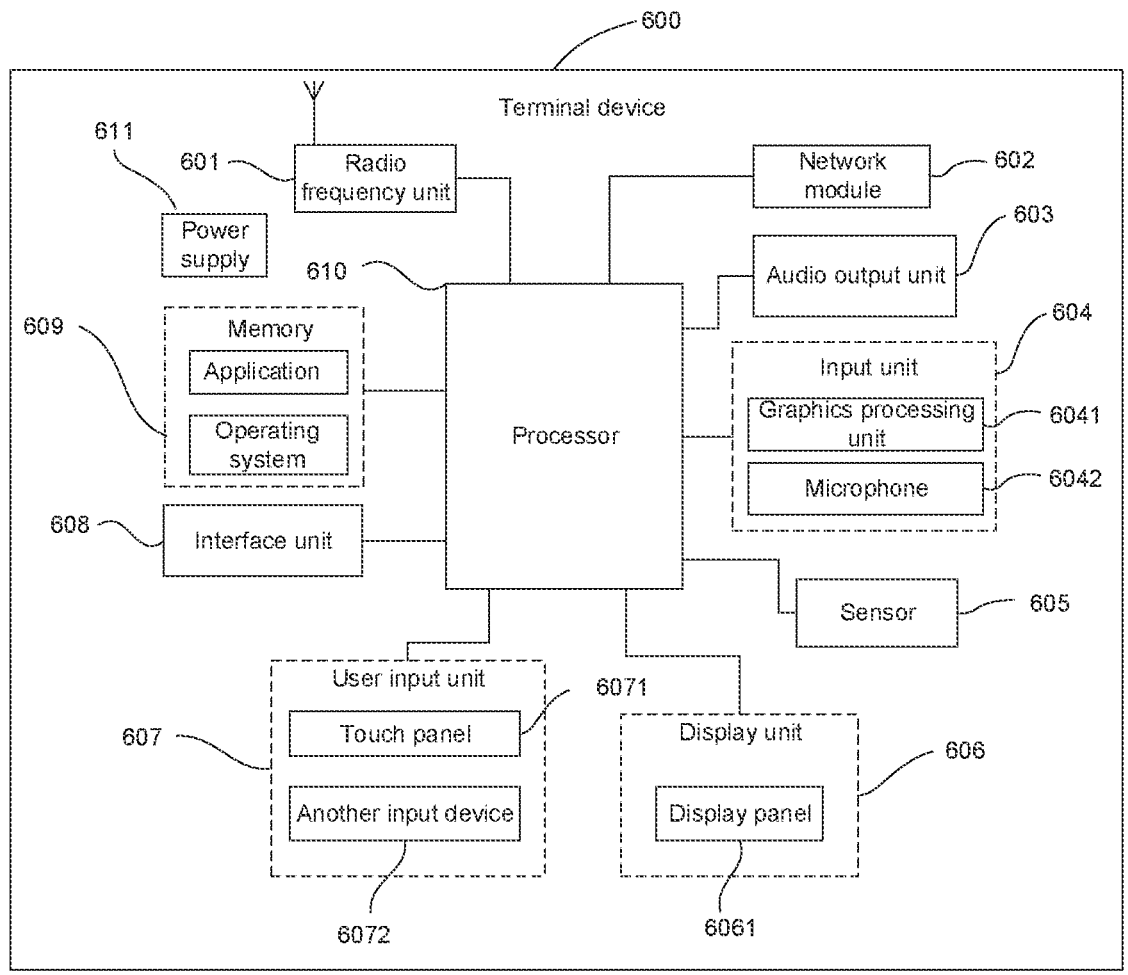
FIG. 6 is a structural diagram of a terminal device according to still another embodiment of the present disclosure.

FIG. 6 is a structural diagram of a still another terminal device according to an embodiment of the present disclosure. Referring to FIG. 6, a terminal device 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal device shown in FIG. 6 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

The processor 610 is configured to: in a case that the terminal device has at least two terminal identifiers, report capability allocation information of the terminal device to a network side device, where the capability allocation information is used to indicate an available capability of at least one terminal identifier, and the at least one terminal identifier is a terminal identifier in the at least two terminal identifiers.

In this embodiment of the present disclosure, in the case that the terminal device has the at least two terminal identifiers, the capability allocation information of the terminal device is reported to the network side device, to notify the network side device of the available capability of the at least one terminal identifier. This not only implements negotiation on allocation of a UE capability between connections of different terminal identifiers in a case that the connections of the different terminal identifiers share the UE capability, but also reduces a problem that data is lost because data transmission exceeds the UE capability, thereby improving data transmission reliability.

Optionally, the processor 610 is further configured to:
if a protocol predefines that the terminal device is allowed to report the capability allocation information, report the capability allocation information of the terminal device to the network side device; or
if first indication information received from the network side device indicates that the terminal device is allowed to report the capability allocation information, report the capability allocation information of the terminal device to the network side device, where the first indication information is used to indicate whether the capability allocation information is allowed to be reported.

Optionally, the processor 610 is further configured to:
report the capability allocation information of the terminal device by using a first terminal identifier, where
the first terminal identifier is at least one terminal identifier for which a wireless connection is established or that is in a wireless connection establishment process in the at least two terminal identifiers.

Optionally, the processor 610 is further configured to:
report the capability allocation information of the terminal device by using the first terminal identifier in or after a wireless connection establishment process, where
a terminal identifier used in the wireless connection establishment process is the first terminal identifier or a second terminal identifier, and the second terminal identifier is at least one terminal identifier other than the first terminal identifier in the at least two terminal identifiers.

Optionally, the first terminal identifier is at least one terminal identifiers for which a wireless connection is established in the at least two terminal identifiers; and
the processor 610 is further configured to:
report the capability allocation information of the terminal device by using the first terminal identifier in or after or before a wireless connection establishment process, where
a terminal identifier used in the wireless connection establishment process is a second terminal identifier, and the second terminal identifier is at least one terminal identifier other than the first terminal identifier in the at least two terminal identifiers.

Optionally, the processor 610 is further configured to:
enable a prohibit timer after the capability allocation information of the terminal device is reported by using the first terminal identifier, where
reporting the capability allocation information of the terminal device by using the first terminal identifier is prohibited before the prohibit timer expires.

Optionally, a parameter of the prohibit timer is predefined in a protocol or configured on a network side.

Optionally, the capability allocation information includes at least one of the following:
at least one terminal identifier; or
available capability information of each terminal identifier in at least one terminal identifier, where
the at least one terminal identifier is a terminal identifier in the at least two terminal identifiers.

Optionally, the available capability information includes at least one of the following:
an available L2 buffer size;
an available wireless connection configuration;
an available band combination;
an available band;
a maximum supported data rate; or
an available radio technology type.

Optionally, the available capability information of each terminal identifier includes at least one of the following:
total available capability information of each terminal identifier; or
available capability information of each radio technology type corresponding to each terminal identifier.

Optionally, the radio technology type includes at least one of the following:
CDMA;
CDMA2000;
a GERAN;
a UTRAN;
an E-UTRAN;
5G NR;
Wi-Fi; or
Bluetooth.

Optionally, the terminal identifier includes at least one of the following:
a SIM card number;
an IMSI;
a TMSI;
a S-TMSI;
a 5G-S-TMSI; or
a RNTI.

It should be understood that, in this embodiment of the present disclosure, the radio frequency unit 601 may be configured to receive and send information or a signal in a call process. For example, after receiving downlink data from a base station, the radio frequency unit 601 sends the downlink data to the processor 610 for processing. In addition, the radio frequency unit 601 sends uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 may communicate with a network and another device through a wireless communication system.

The terminal device provides a user with wireless broadband Internet access through the network module 602, for example, helps the user send and receive emails, browse web pages, and access streaming media.

The audio output unit 603 may convert audio data received by the radio frequency unit 601 or the network module 602 or stored in the memory 609 into an audio signal and output the audio signal as a sound. In addition, the audio output unit 603 may further provide audio output (for example, call signal receiving sound or message receiving sound) related to a specific function performed by the terminal 600. The audio output unit 603 includes a loudspeaker, a buzzer, a receiver, and the like.

The input unit 604 is configured to receive an audio signal or a video signal. The input unit 604 may include a graphics processing unit (GPU) 6041 and a microphone 6042. The graphics processing unit 6041 is configured to process image data of a static picture or a video obtained by an image capture apparatus (for example, a camera) in video capture mode or image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 may receive sound and can process such sound into audio data. Processed audio data may be converted, in a call mode, into a format that can be sent to a mobile communication base station by using the radio frequency unit 601 for output.

The terminal device 600 further includes at least one sensor 605, such as an optical sensor, a motion sensor, and other sensors. Optionally, the optical sensor includes an ambient light sensor and a proximity sensor. The ambient light sensor may adjust luminance of the display panel 6061 based on brightness of ambient light. The proximity sensor may turn off the display panel 6061 and/or backlight when the terminal device 600 approaches an ear. As a type of the motion sensor, an accelerometer sensor may detect an acceleration in each direction (generally, three axes), and detect a value and a direction of gravity when the accelerometer sensor is static, and may be used to recognize a terminal device posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, and an infrared sensor. Details are not described herein.

The display unit 606 is configured to display information entered by a user or information provided for the user. The display unit 606 may include a display panel 6061. The display panel 6061 may be configured in a form of a liquid crystal display (LCD), an organic light-emitting diode (OLED), or the like.

The user input unit 607 may be configured to receive input digit or character information, and generate a key signal input related to a user setting and function control of the terminal device. Optionally, the user input unit 607 includes a touch panel 6071 and another input device 6072. The touch panel 6071 is also referred to as a touchscreen, and may collect a touch operation performed by a user on or near the touch panel 6071 (such as an operation performed by a user on the touch panel 6071 or near the touch panel 6071 by using any proper object or accessory, such as a finger or a stylus). The touch panel 6071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 610, and can receive and execute a command sent by the processor 610. In addition, the touch panel 6071 may be of a resistive type, a capacitive type, an infrared type, a surface acoustic wave type, or the like. The user input unit 607 may include another input device 6072 in addition to the touch panel 6071. Optionally, the another input device 6072 may include but is not limited to a physical keyboard, a functional button (such as a volume control button or a power on/off button), a trackball, a mouse, and a joystick. Details are not described herein.

Further, the touch panel 6071 may cover the display panel 6061. When detecting the touch operation on or near the touch panel 6071, the touch panel 6071 transmits the touch operation to the processor 610 to determine a type of a touch event, and then the processor 610 provides corresponding visual output on the display panel 6061 based on the type of the touch event. Although in FIG. 6, the touch panel 6071 and the display panel 6061 are configured as two independent components to implement input and output functions of the terminal device, in some embodiments, the touch panel 6071 and the display panel 6061 can be integrated to implement the input and output functions of the terminal device. Details are not limited herein.

The interface unit 608 is an interface for connecting an external apparatus to the terminal device 600. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 608 may be configured to receive an input (for example, data information or power) from an external apparatus and transmit the received input to one or more elements in the terminal device 600, or transmit data between the terminal device 600 and the external apparatus.

The memory 609 may be configured to store a software program and various data. The memory 609 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 609 may include a high-speed random access memory, and may further include a nonvolatile memory, for example, at least one magnetic disk storage device, a flash storage device, or another volatile solid-state storage device.

The processor 610 is a control center of the terminal. The processor 610 uses various interfaces and lines to connect the various parts of the entire terminal device, and performs various functions of the terminal device and processes data by running or executing software programs and/or modules stored in the memory 609 and invoking data stored in the memory 609, to monitor the terminal device as a whole. The processor 610 may include one or more processing units. Optionally, the processor 610 may integrate an application processor and a modem processor. The application processor mainly deals with an operating system, a user interface, and an application. The modem processor mainly deals with wireless communication. It may be understood that, alternatively, the modem processor may not be integrated into the processor 610.

The terminal device 600 may further include the power supply 611 (such as a battery) supplying power to each component. Preferably, the power supply 611 may be logically connected to the processor 610 by using a power management system, so as to implement functions such as charging management, discharging management and power consumption management by using the power management system.

In addition, the terminal device 600 includes some function modules not shown, and details are not described herein.

Optionally, an embodiment of the present disclosure further provides a terminal device, including a processor 610, a memory 609, and a program that is stored in the memory 609 and executable on the processor 610. When the processor 610 executes the program, the processes of the foregoing terminal capability negotiation method embodiment are implemented and a same technical effect can be achieved. To avoid repetition, details are not described herein again.

Figure 7:
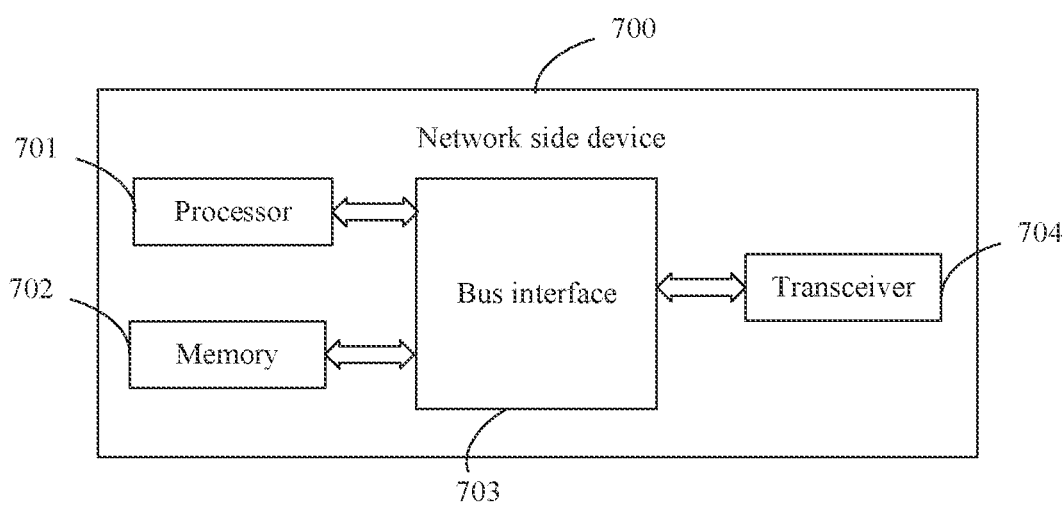
FIG. 7 is a structural diagram of a network side device according to still another embodiment of the present disclosure.

Referring to FIG. 7, FIG. 7 is a structural diagram of a network side device according to still another embodiment of the present disclosure. As shown in FIG. 7, a network side device 700 includes a processor 701, a memory 702, a bus interface 703, and a transceiver 704, where the processor 701, the memory 702, and the transceiver 704 are all connected to the bus interface 703.

In this embodiment of the present disclosure, the network side device 700 further includes a program that is stored in the memory 702 and executable on the processor 701.

In this embodiment of the present disclosure, the transceiver 704 is configured to:

receive capability allocation information of a terminal device reported by the terminal device, where the capability allocation information is used to indicate an available capability of at least one terminal identifier, and the at least one terminal identifier is a terminal identifier in at least two terminal identifiers of the terminal device.

Optionally, the transceiver 704 is further configured to:

send first indication information to the terminal device, where the first indication information is used to indicate whether the terminal device is allowed to report the capability allocation information.

Optionally, the transceiver 704 is further configured to:

receive the capability allocation information of the terminal device reported by the terminal device by using a first terminal identifier, where the first terminal identifier is at least one terminal identifier for which a wireless connection is established or that is in a wireless connection establishment process in the at least two terminal identifiers included in the terminal device.

Optionally, the processor 701 is configured to:

configure a parameter of a prohibit timer for the terminal device.

Optionally, the capability allocation information includes at least one of the following:

at least one terminal identifier; or available capability information of each terminal identifier in at least one terminal identifier, where the at least one terminal identifier is a terminal identifier in the at least two terminal identifiers.

Optionally, the available capability information includes at least one of the following:

an available L2 buffer size;

an available wireless connection configuration;

an available band combination;
an available band;
a maximum supported data rate; or
an available radio technology type.

Optionally, the available capability information of each terminal identifier includes at least one of the following:
total available capability information of each terminal identifier; or
available capability information of each radio technology type corresponding to each terminal identifier.

Optionally, the radio technology type includes at least one of the following:
CDMA;
CDMA2000;
a GERAN;
a UTRAN;
an E-UTRAN;
5G NR;
Wi-Fi; or
Bluetooth.

Optionally, the terminal identifier includes at least one of the following:
a SIM card number;
an IMSI;
a TMSI;
a S-TMSI;
a 5G-S-TMSI; or
a RNTI.

Optionally, the network side device is a source node; and
Optionally, the transceiver 704 is further configured to:
send the capability allocation information of the terminal device to a target node after the capability allocation information of the terminal device reported by the terminal device is received.

An embodiment of the present disclosure further provides a non-transitory computer-readable storage medium. The non-transitory computer-readable storage medium stores a program, and when a processor executes the program, the processes of the foregoing terminal capability negotiation method embodiment are implemented and a same technical effect can be achieved. To avoid repetition, details are not described herein again. The non-transitory computer-readable storage medium is, for example, a read-only memory (Read-Only Memory, ROM for short), a random access memory (Random Access Memory, RAM for short), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or only by hardware. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A terminal capability negotiation method, comprising:
in a case that a terminal device has at least two terminal identifiers, reporting, by the terminal device, capability allocation information of the terminal device to a network side device, wherein
the capability allocation information is used to indicate: for sharable capability, an available capability of each of the at least two terminal identifiers;
the capability allocation information comprises available capability information of each terminal identifier in the at least two terminal identifiers; and
the sharable capability comprises at least one of the following: a L2 buffer size; or a maximum data rate.

2. The method according to claim 1, wherein the reporting, by the terminal device, capability allocation information of the terminal device to a network side device comprises:
if a protocol predefines that the terminal device is allowed to report the capability allocation information, reporting, by the terminal device, the capability allocation information of the terminal device to the network side device; or
if first indication information received from the network side device indicates that the terminal device is allowed to report the capability allocation information, reporting, by the terminal device, the capability allocation information of the terminal device to the network side device, wherein the first indication information is used to indicate whether the capability allocation information is allowed to be reported.

3. The method according to claim 1, wherein the reporting, by the terminal device, capability allocation information of the terminal device to a network side device comprises:
reporting, by the terminal device, the capability allocation information of the terminal device by using a first terminal identifier, wherein
the first terminal identifier is at least one terminal identifier for which a wireless connection is established or that is in a wireless connection establishment process in the at least two terminal identifiers.

4. The method according to claim 3, wherein the reporting, by the terminal device, the capability allocation information of the terminal device by using a first terminal identifier comprises:
reporting, by the terminal device, the capability allocation information of the terminal device by using the first terminal identifier in or after a wireless connection establishment process, wherein
a terminal identifier used in the wireless connection establishment process is the first terminal identifier or a second terminal identifier, and the second terminal identifier is at least one terminal identifier other than the first terminal identifier in the at least two terminal identifiers.

5. The method according to claim 3, wherein the first terminal identifier is at least one terminal identifiers for which a wireless connection is established in the at least two terminal identifiers; and
the reporting, by the terminal device, the capability allocation information of the terminal device by using a first terminal identifier comprises:
reporting, by the terminal device, the capability allocation information of the terminal device by using the first terminal identifier in or after or before a wireless connection establishment process, wherein
a terminal identifier used in the wireless connection establishment process is a second terminal identifier, and the second terminal identifier is at least one terminal identifier other than the first terminal identifier in the at least two terminal identifiers.

6. The method according to claim 3, wherein after the reporting, by the terminal device, the capability allocation information of the terminal device by using a first terminal identifier, the method further comprises:
enabling, by the terminal device, a prohibit timer, wherein reporting, by the terminal device, the capability allocation information of the terminal device by using the first terminal identifier is prohibited before the prohibit timer expires.

7. The method according to claim 6, wherein a parameter of the prohibit timer is predefined in a protocol or configured on a network side.

8. The method according to claim 1, wherein the capability allocation information further comprises
at least one terminal identifier;
wherein
the at least one terminal identifier is a terminal identifier in the at least two terminal identifiers.

9. The method according to claim 1, wherein the sharable capability further comprises at least one of:
a wireless connection configuration;
a band combination;
a band;
or
a radio technology type.

10. The method according to claim 1, wherein the available capability information of each terminal identifier comprises at least one of:
total available capability information of each terminal identifier; or
available capability information of each radio technology type corresponding to each terminal identifier.

11. The method according to claim 10, wherein the radio technology type comprises at least one of:
Code Division Multiple Access (CDMA);
CDMA2000;
a GSM/EDGE radio access network (GERAN);
a UMTS terrestrial radio access network (UTRAN);
an evolved UMTS terrestrial radio access network (E-UTRAN);
fifth generation new radio (5G NR);
Wi-Fi; or
Bluetooth.

12. The method according to claim 1, wherein the terminal identifier comprises at least one of:
a subscriber identity module (SIM) card number;
an international mobile subscriber identity (IMSI);
a temporary mobile subscriber identity (TMSI);
a system architecture evolution-temporary mobile subscriber identity (S-TMSI);
a fifth generation system architecture evolution-temporary mobile subscriber identity (5G-S-TMSI); or
a radio network temporary identity (RNTI).

13. A terminal device, comprising a processor, a memory, and a program that is stored in the memory and executable on the processor, wherein the program, when executed by the processor, causes the terminal device to perform:
in a case that the terminal device has at least two terminal identifiers, reporting capability allocation information of the terminal device to a network side device, wherein
the capability allocation information is used to indicate:
for sharable capability, an available capability of each of the at least two terminal identifiers;
the capability allocation information comprises available capability information of each terminal identifier in the at least two terminal identifiers; and
the sharable capability comprises at least one of the following: a L2 buffer size; or a maximum data rate.

14. The terminal device according to claim 13, wherein the program, when executed by the processor, causes the terminal device to perform:
if a protocol predefines that the terminal device is allowed to report the capability allocation information, reporting the capability allocation information of the terminal device to the network side device; or
if first indication information received from the network side device indicates that the terminal device is allowed to report the capability allocation information, reporting the capability allocation information of the terminal device to the network side device, wherein the first indication information is used to indicate whether the capability allocation information is allowed to be reported.

15. The terminal device according to claim 13, wherein the program, when executed by the processor, causes the terminal device to perform:
reporting the capability allocation information of the terminal device by using a first terminal identifier, wherein
the first terminal identifier is at least one terminal identifier for which a wireless connection is established or that is in a wireless connection establishment process in the at least two terminal identifiers.

16. The terminal device according to claim 15, wherein the program, when executed by the processor, causes the terminal device to perform:
reporting the capability allocation information of the terminal device by using the first terminal identifier in or after a wireless connection establishment process, wherein
a terminal identifier used in the wireless connection establishment process is the first terminal identifier or a second terminal identifier, and the second terminal identifier is at least one terminal identifier other than the first terminal identifier in the at least two terminal identifiers.

17. The terminal device according to claim 15, wherein the first terminal identifier is at least one terminal identifiers for which a wireless connection is established in the at least two terminal identifiers; and
the program, when executed by the processor, causes the terminal device to perform:

reporting the capability allocation information of the terminal device by using the first terminal identifier in or after or before a wireless connection establishment process, wherein a terminal identifier used in the wireless connection establishment process is a second terminal identifier, and the second terminal identifier is at least one terminal identifier other than the first terminal identifier in the at least two terminal identifiers.

18. The terminal device according to claim 15, wherein the program, when executed by the processor, causes the terminal device to further perform:

enabling a prohibit timer, wherein reporting the capability allocation information of the terminal device by using the first terminal identifier is prohibited before the prohibit timer expires.

19. The terminal device according to claim 18, wherein a parameter of the prohibit timer is predefined in a protocol or configured on a network side.

20. A network side device, comprising a processor, a memory, and a program that is stored in the memory and executable on the processor, wherein the program, when executed by the processor, causes the network side device to perform:

receiving capability allocation information of a terminal device reported by the terminal device, wherein the capability allocation information is used to indicate: for sharable capability, an available capability of each of the at least two terminal identifiers;

the capability allocation information comprises available capability information of each terminal identifier in the at least two terminal identifiers; and the sharable capability comprises at least one of the following: a L2 buffer size; or a maximum data rate.

* * * * *